United States Patent [19]

Speelman

[11] Patent Number: 5,271,580
[45] Date of Patent: Dec. 21, 1993

[54] AIRCREW CONTROLLABLE SUNLIGHT FILTER FOR AN AIRCRAFT COCKPIT

[76] Inventor: Ralph Speelman, 1810 Stonewood Dr, Dayton, Ohio 45432

[21] Appl. No.: 891,140
[22] Filed: Jun. 1, 1992
[51] Int. Cl.$^5$ .............................................. B64C 1/10
[52] U.S. Cl. .............................. 244/121; 296/96.19
[58] Field of Search ..................... 244/121; 296/96.19

[56] References Cited

U.S. PATENT DOCUMENTS

| | | | |
|---|---|---|---|
| 2,636,420 | 4/1953 | Ryan et al. | 296/96.19 |
| 3,056,626 | 10/1962 | Browne | 296/96.19 X |
| 3,245,315 | 4/1966 | Marks et al. | 88/61 |
| 3,400,972 | 9/1968 | McIntyre et al. | 296/96.19 X |
| 3,621,838 | 11/1971 | Harding et al. | 128/82.1 |
| 4,057,054 | 11/1977 | Giannone | 128/76.5 |
| 4,396,259 | 8/1983 | Miller | 351/158 |
| 4,494,835 | 1/1985 | Hamid et al. | 351/158 |
| 4,773,717 | 9/1988 | Pai et al. | 350/3.7 |

FOREIGN PATENT DOCUMENTS 1413577A 7/1988 U.S.S.R.
2170613A 8/1986 United Kingdom.

Primary Examiner—Margaret A. Focarino
Assistant Examiner—Christophe Ellis
Attorney, Agent, or Firm—Fredric L. Sinder; Thomas L. Kundert

[57] ABSTRACT

A aircrew controllable sunlight filter for preventing sunlight washout of aircraft instruments comprises as part of an otherwise conventional laminated aircraft transparency an additional ply or layer of photosensitive material positioned near the inside of the transparency. An ultraviolet light source aimed by an aircrew member at a part area of the transparency will cause the transparency to darken and reduce the amount of visible sunlight striking the aircraft instruments.

4 Claims, 1 Drawing Sheet

AIRCREW CONTROLLABLE SUNLIGHT FILTER FOR AN AIRCRAFT COCKPIT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to sunlight filters, and more particularly to an aircrew controllable sunlight filter for an aircraft cockpit transparency.

The ability of aircrew members to utilize emerging technologies for aircraft instrumentation displays has been limited by the sensitivity of those displays to sunlight washout.

Unfortunately, seemingly simple solutions such as incorporating a layer of photosensitive material as part of an aircraft cockpit transparency will not work. Photosensitive materials are commonly used in sunglasses which automatically darken in response to sunlight. Photosensitive materials darken in response to the ultraviolet (UV) radiation present in sunlight. The problem is that aircraft transparencies, such as windshields and canopies, are usually made of laminated material, comprising many layers, or plies, of different materials cemented together. The different materials, and their position inside a laminate, are chosen according to their various physical and optical properties. The materials used for some of the layers are, unfortunately, structurally degraded by UV light. Therefore, the outermost layers of aircraft transparencies are deliberately chosen to filter out UV light. Because of those outermost layers, insufficient UV light will reach an inner photosensitive layer to trigger a photosensitive effect.

Another problem with typical photosensitive materials is their limited service life, primarily the number of light to dark cycles they can undergo before they lose their effectiveness. Sunglasses, unlike aircraft transparencies, generally are not left continuously outdoors and can, in any event, be inexpensively replaced.

Other solutions, such as incorporating a ply of electro-optical shutter material in combination with a photocell, mounted either inside or outside the cockpit, and a power source, are not technologically mature enough to incorporate as part of a structurally robust and affordable cockpit transparency.

Thus it is seen that there is a need for a successful method for darkening an aircraft cockpit transparency in response to sunlight to prevent or reduce sunlight washout of aircraft instrumentation displays.

It is, therefore, a principal object of the present invention to provide a practical aircrew controllable sunlight filter for an aircraft cockpit transparency.

It is a feature of the present invention that it permits localized darkening of selected areas of an aircraft cockpit transparency.

It is another feature of the present invention that it can also be used to reduce the cooling load on aircraft environmental control systems.

It is yet another feature of the present invention that it can be easily retrofitted to existing aircraft cockpit transparencies.

It is an advantage of the present invention that it selectively energizes the photosensitive filtering material so that its service life is increased.

It is another advantage of the present invention that its placement toward the inside of an aircraft cockpit transparency protects it from environmental sunlight and thus further increases its service life.

It is yet another advantage of the present invention that it is simple to understand and will be simple and straightforward to implement and to use.

These and other objects, features and advantages of the present invention will become apparent as the description of certain representative embodiments proceeds.

SUMMARY OF THE INVENTION

The present invention provides an aircrew controllable sunlight filter for an aircraft cockpit. The unique discovery of the present invention is that a layer of photosensitive material can be embedded as an inner ply of a laminated aircraft transparency, preferably close to the inside surface of the aircraft transparency, so that an aircrew controllable UV light source can darken all or part of the transparency to visible light from inside the cockpit.

Accordingly, the present invention is directed generally to a transparency having an inside and an outside, comprising a plurality of plies of transparent material, wherein a first one or more of the plies of transparent material filter out substantially all of a first preselected range of wavelengths of light, wherein a second one or more of the plies of the transparent material are located nearer to the inside of the transparency than the first one or more plies, and wherein the second one or more plies are made of a photosensitive material such that, when a ply of the photosensitive material is irradiated by light of the first preselected range of wavelengths, the ply become less transparent to light of a second preselected range of wavelengths. The first preselected range of wavelengths may comprise ultraviolet light and the second preselected range of wavelengths may comprise visible light.

Accordingly, the present invention is directed more specifically to an aircraft transparency, comprising a plurality of plies of transparent material, wherein one or more of the plies of transparent material are made of photosensitive material such that, when a ply of the photosensitive material is irradiated by light of a first preselected range of wavelengths, the ply becomes less transparent to light of a second preselected range of wavelengths. The first preselected range of wavelengths may comprise ultraviolet light and the second preselected range of wavelengths may comprise visible light. The first preselected range of wavelengths may also be characterized as any preselected range of electromagnetic radiation. The transparency may have an outside and an inside and the one or more plies of photosensitive material may be located nearer to the inside of the aircraft transparency than to the outside. A source of ultraviolet light may be included as part of the aircraft transparency.

The present invention is also directed to a covering for an aircraft cockpit, comprising an aircraft transparency, wherein the aircraft transparency comprises a plurality of plies of transparent material, and wherein one or more of the plies of transparent material are made of photosensitive material such that, when a ply of the photosensitive material is irradiated by light of a first preselected range of wavelengths, it becomes less transparent to light of a second preselected range of wavelengths. The first preselected range of wavelengths may comprise ultraviolet light and the second preselected range of wavelengths may comprise visible light. The first preselected range of wavelengths may be characterized as any preselected range of electromagnetic radiation. The transparency may have an outside and an inside and the one or more plies of photosensitive material may be located nearer to the inside of the aircraft transparency than to the outside. The invention may further comprise a source of ultraviolet light mounted inside the cockpit.

The present invention is further directed to a method for making a part area of an aircraft transparency, which transparency has a plurality of plies of transparent material, less transparent to light of a second preselected range of wavelengths, comprising the steps of providing as part of the aircraft transparency one or more additional plies of photosensitive material such that, when a ply of the photosensitive material is irradiated by light of a first preselected range of wavelengths, the ply becomes less transparent to light of the second preselected range of wavelengths; and, irradiating the part area of the aircraft transparency with light of the first preselected range of wavelengths. The first preselected range of wavelengths may comprise ultraviolet light and the second preselected range of wavelengths may comprise visible light. The first preselected range of wavelengths may be characterized as any preselected range of electromagnetic radiation. The transparency may have an inside and an outside, and the one or more additional plies of photosensitive material may be located nearer to the inside of the transparency than to the outside. The irradiation may be performed by an aircrew member of the aircraft.

The invention is yet also directed to a method for preventing sunlight washout of aircraft instruments inside an aircraft cockpit, comprising the steps of providing a transparency over the aircraft cockpit, which transparency has a plurality of plies of transparent material, providing as part of the transparency one or more additional plies of photosensitive material such that, when a ply of the photosensitive material is irradiated by ultraviolet light, the ply becomes less transparent to visible light, and irradiating the part area of the transparency through which sunlight passes to washout the aircraft instruments with ultraviolet light.

DESCRIPTION OF THE DRAWINGS

The present invention will be more clearly understood from a reading of the following detailed description in conjunction with the accompanying drawings wherein.

DETAILED DESCRIPTION

Figure 1:
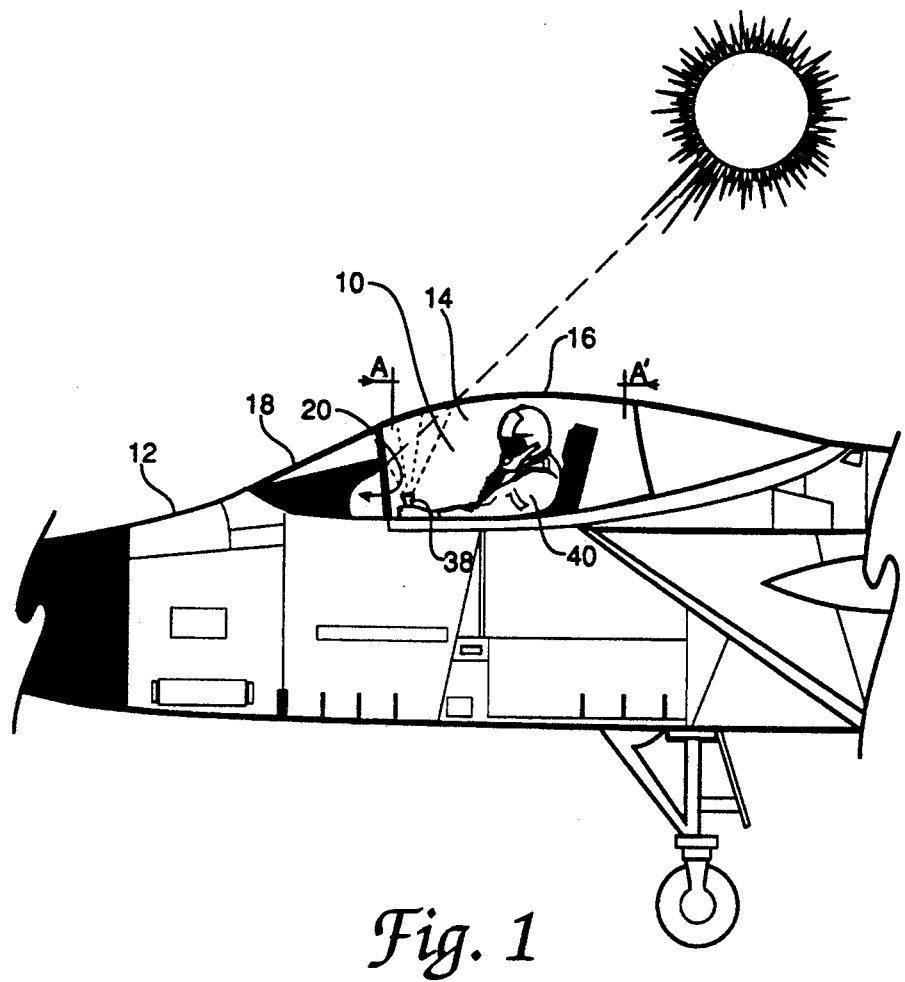
FIG. 1 is a perspective view of the cockpit section of an aircraft showing its aircraft transparency and a cockpit mounted source of UV light according to the teachings of the present invention; and, FIG. 2 is a representative partial fore-and-aft cross-section of the aircraft transparency shown in FIG. 1 taken between lines A and A'.

Referring now to FIG. 1 of the drawings, there is shown a perspective view of the cockpit section 10 of an aircraft 12. Cockpit 10 is covered by a transparency 14 comprising an overhead canopy section 16 and a windshield section 18. Inside cockpit 10 are mounted an array of instruments 20. Sunlight streaming inside cockpit 10 through the top or sides of canopy 16 can easily washout instruments 20.

Figure 2:
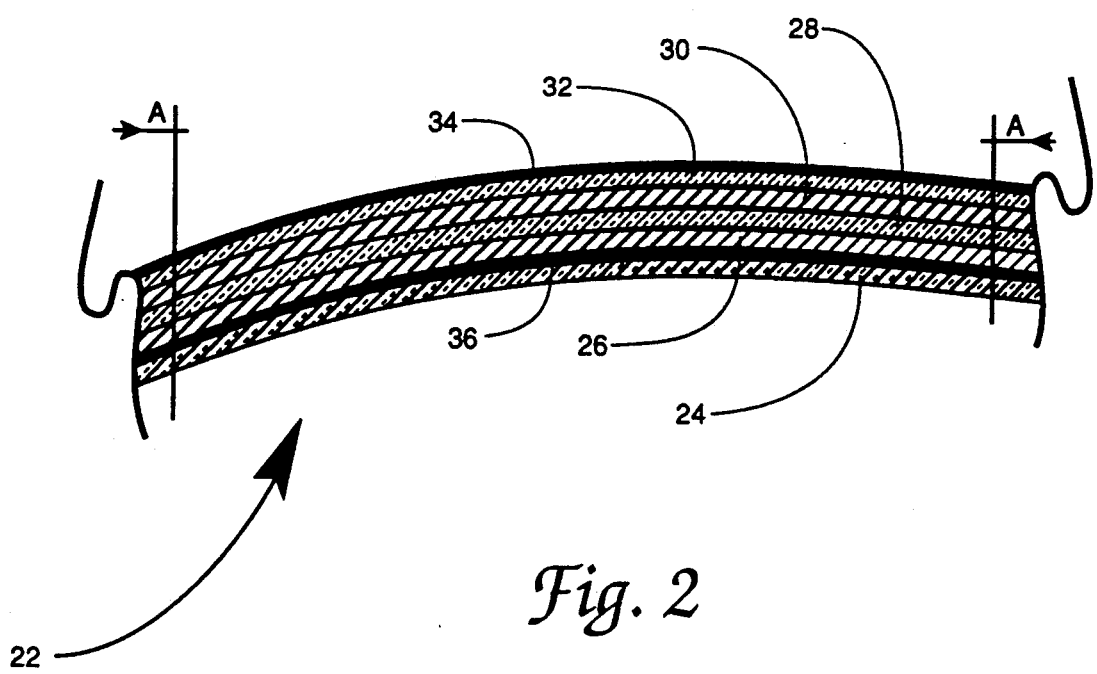

FIG. 2 is a representative partial fore-and-aft cross-section 22 of aircraft transparency 14 taken between lines A and A'. Transparency 14 is a laminate structure comprising a number of different transparent layers or plies 24, 26, 28, 30, 32 and 34. The number and thickness of the plies shown in FIG. 2 are merely representative and the number and relative thicknesses of the plies will vary for different actual transparencies. Plies 26 and 30 are structural layers providing strength and impact resistance for transparency 14. Outermost plies 32 and 34 block UV light that would otherwise degrade over time the structural integrity of plies 26 and 30.

The present invention adds an additional ply 36 to transparency 14. Ply 36 is made of photosensitive material which will darken (to visible light) in response to irradiation by UV light. A source 38 of UV light is mounted inside cockpit 10 at a location convenient to a pilot 40 or other aircrew member. UV light source 38 can be switched on and off and can be moved to focus its beam on different area sections of transparency 14. UV light source 38 is shown mounted on a flexible stalk. Those with skill in the art will readily see other methods for mounting light source 38 and making it positionable.

Light source 38 may also be made capable of adjustable intensity or adjustable pulse rate. Thus, the degree of darkening can be varied, not only to make the degree of darkening suitable for the amount of sunlight washout, but also for other purposes such as selectively reducing the cockpit cooling load on the aircraft environmental control system.

Ply 36 may also be made as a separate layer that can be easily retrofitted to the inside of existing aircraft transparencies.

The term photosensitive as used in this description is intended to mean becoming more or less transparent (lightening or darkening) to light in response to irradiation by light. It is not intended to include other changes in material properties in response to light.

Those with skill in the art will readily see many other uses for the present invention. For example, it can be used to convert normal commercial aircraft to a trainer configuration. Transparency panels can be selectively turned on and off to darken all or part of the cockpit to simulate night or bad weather conditions. The instructor pilot can retain full vision on his side, thus optimizing safety.

Use of the teachings of the present invention can also be extended to other areas such as windows in office buildings and automobile sunroofs where the combination of an outside UV barrier and inside photosensitive layer provide a means for selectively controlling the darkening response of the photosensitive layer.

Those with skill in the art will also readily see that the present invention broadly includes selectively filtering any preselected range of wavelengths of light (in addition to visible light) using another preselected range of wavelengths (in addition to ultraviolet light). Those ranges of wavelengths need not even be light, but may also include any preselected range of electromagnetic radiation. Those with skill in the art of the invention will also see that the invention does not require a source of electromagnetic radiation for triggering the photosensitive process (as, for example, an ultraviolet light source inside a cockpit), only that the transparency be constructed so that it will respond to a source of electromagnetic radiation as described.

The disclosed aircrew controllable sunlight filter successfully demonstrates the use of an inner layer of photosensitive material as part of an aircraft transparency to selectively darken part areas of the transparency by beaming UV light at the transparency from inside the transparency in order to prevent sunlight washout of flight instruments. Although the disclosed apparatus is specialized, its teachings will find application in other areas where other structural constraints, such as the need to protect the structural layers or an aircraft transparency from UV radiation, seemingly prevent the use of otherwise simple solutions.

It is understood that various modifications to the invention as described may be made, as might occur to one with skill in the field of the invention, within the scope of the claims. Therefore, all embodiments contemplated have not been shown in complete detail. Other embodiments may be developed scope of the claims.

I claim:

1. An aircraft transparency system for covering an aircraft cockpit, comprising:
    (a) a transparency having an inside facing the interior of the aircraft cockpit and an outside facing away from the interior of the aircraft cockpit, the transparency comprising a plurality of plies of transparent material, including:
        (i) a first ply of transparent material that will filter out ultraviolet light; and,
        (ii) a second ply of transparent material located nearer to the inside of the transparency than the first ply, wherein the second ply is made of a photosensitive material such that, when the second ply is irradiated by ultraviolet light from the interior of the cockpit, the second ply becomes less transparent to visible light; and,
    (b) a source of said ultraviolet light located in the interior of the cockpit.

2. A method for preventing sunlight washout of aircraft instruments inside an aircraft cockpit, comprising the steps of:
    (a) providing an aircraft transparency having an inside facing the interior of the aircraft cockpit and an outside facing away from the interior of the aircraft cockpit, the transparency further comprising a plurality of plies of transparent material, including:
        (i) a first ply of transparent material that will filter out ultraviolet light; and,
        (ii) a second ply of transparent material located nearer to the inside of the transparency than the first ply, wherein the second ply is made of a photosensitive material such that, when the second ply is irradiated by ultraviolet light from the interior of the cockpit, the second ply becomes less transparent to visible light;
    (b) providing a source of said ultraviolet light located inside the cockpit; and,
    (c) irradiating with said ultraviolet light from the ultraviolet light source a part area of the transparency through which sunlight would otherwise pass to washout the aircraft instruments.

3. A transparency system for covering an enclosed space, comprising:
    (a) a transparency having an inside facing the interior of the enclosed space and an outside facing away from the interior of the enclosed space, the transparency comprising a plurality of plies of transparent material, including:
        (i) a first ply of transparent material that will filter out light of a first preselected range of wavelengths; and,
        (ii) a second ply of transparent material located nearer to the inside of the transparency than the first ply, wherein the second ply is made of a photosensitive material such that, when the second ply is irradiated by light of the first preselected range of wavelengths coming from the interior of the enclosed space, the second ply becomes less transparent to light of a second preselected range of wavelengths; and,
    (b) a source of said light of the first preselected range of wavelengths located in the interior of the enclosed space.

4. A transparency system for covering an enclosed space, comprising:
    (a) a transparency having an inside facing the interior of the enclosed space and an outside facing away from the interior of the enclosed space, the transparency comprising a plurality of plies of transparent material, including:
        (i) a first ply of transparent material that will filter out ultraviolet light; and,
        (ii) a second ply of transparent material located nearer to the inside of the transparency than the first ply, wherein the second ply is made of a photosensitive material such that, when the second ply is irradiated by ultraviolet light from the interior of the enclosed space, the second ply becomes less transparent to visible light; and,
    (b) a source of said ultraviolet light located in the interior of the enclosed space.

* * * * *